(12) United States Patent
Gröner et al.

(10) Patent No.: US 8,956,531 B2
(45) Date of Patent: Feb. 17, 2015

(54) FILTER DEVICE

(75) Inventors: Alfred Gröner, Öhringen (DE); Gerhard Steiner, Öhringen (DE)

(73) Assignee: Mahle International GmbH (DE)

( * ) Notice: Subject to any disclaimer, the term of this patent is extended or adjusted under 35 U.S.C. 154(b) by 531 days.

(21) Appl. No.: 13/391,899

(22) PCT Filed: Aug. 11, 2010

(86) PCT No.: PCT/EP2010/061685
§ 371 (c)(1),
(2), (4) Date: May 8, 2012

(87) PCT Pub. No.: WO2011/023550
PCT Pub. Date: Mar. 3, 2011

(65) Prior Publication Data
US 2012/0217191 A1 Aug. 30, 2012

(30) Foreign Application Priority Data
Aug. 24, 2009 (DE) .......................... 10 2009 038 402

(51) Int. Cl.
*B01D 35/147* (2006.01)
*B01D 29/11* (2006.01)
*F16K 17/06* (2006.01)

(52) U.S. Cl.
CPC ............ *B01D 35/147* (2013.01); *B01D 29/114* (2013.01); *F16K 17/06* (2013.01)
USPC ......................................... 210/130; 251/61.2

(58) Field of Classification Search
None
See application file for complete search history.

(56) References Cited

U.S. PATENT DOCUMENTS

| | | | |
|---|---|---|---|
| 3,474,906 A * | 10/1969 | Tennis | 210/90 |
| 3,499,269 A * | 3/1970 | Bois | 55/309 |
| 3,628,661 A * | 12/1971 | Codo | 210/130 |

FOREIGN PATENT DOCUMENTS

| | | |
|---|---|---|
| CN | 101507888 A | 8/2009 |
| DE | 1436289 A1 | 5/1969 |
| DE | 10105612 A1 | 8/2002 |
| DE | 10248907 A1 | 4/2004 |
| DE | 102004005772 A1 | 8/2005 |

(Continued)

OTHER PUBLICATIONS

English translation of CNOA for CN-201080038062.1, dated Dec. 2, 2013.
English abstract for DE-10248907, Apr. 2004.
English abstract for CN-101507888, Aug. 2009.

(Continued)

*Primary Examiner* — Terry Cecil
(74) *Attorney, Agent, or Firm* — Rader, Fishman & Grauer PLLC

(57) ABSTRACT

A filter device may include a filter housing having at least one filter element configured to separate the filter housing into a raw side and a clean side. A bypass valve may control a bypass for circumventing the at least one filter element, wherein the bypass valve may have a valve member for controlling a bypass opening connecting the clean side of a coupling chamber of the bypass valve with the raw side. The valve member may be configured to close the bypass opening via a pretension generated by a closing spring. The bypass valve may be an actuating device for changing the pretension acting on the valve member and the actuating device may be coupled with at least one control chamber and configured to set the pretension acting on the valve member based at least in part on a control pressure of the control chamber.

20 Claims, 7 Drawing Sheets

(56) References Cited

FOREIGN PATENT DOCUMENTS

| | | |
|---|---|---|
| DE | 202007013216 U1 | 2/2009 |
| FR | 1575877 A | 7/1969 |
| WO | WO-2008/027347 A2 | 3/2008 |

OTHER PUBLICATIONS

English abstract provided for DE-1015612, Aug. 2002.
English abstract for DE-102004005772, Aug. 2005.

* cited by examiner

FILTER DEVICE

CROSS-REFERENCE TO RELATED APPLICATIONS

This application claims priority to German Patent Application 10 2009 038 402.2 filed on Aug. 24, 2009 and PCT/EP2010061685 filed on Aug. 11, 2010, which are hereby incorporated by reference in their entireties.

TECHNICAL FIELD

The present invention relates to a filter device, in particular a fluid filter device, preferably an oil filter device, with the features of the introductory clause of Claim 1.

BACKGROUND

Filter devices of this type can be arranged for example in industrial facilities in a hydraulic circuit, in order to filter impurities out from the hydraulic medium. The hydraulic medium can be a lubricating oil or a coolant. Preferably it is a coolant/lubricant. Lubricants which serve at the same time for cooling can be used for example in processing machines. In such applications, this may concern an open hydraulic circuit in which at least a portion of the coolant/lubricant is introduced directly into the processing zone. In the case of a processing by machining, an intensive contamination of the coolant/lubricant occurs. Such impurities are removed from the coolant/lubricant by means of filter devices which are presented here. The purified coolant/lubricant can then be used again.

By the filtering operation, filter elements which separate a raw side from a clean side within the respective filter device can gradually become clogged by the separated impurities. A so-called filter cake forms on the raw side on the filter element. Through these accretions, the through-flow resistance of the filter element increases. At the same time also a significant improvement to the filtration effect occurs.

In order to avoid damage to the filter element or respectively the filter device in the case of too high a pressure rise on the filter element, it is basically possible to provide a bypass for circumventing the filter element, which can be controlled by means of a bypass valve. The bypass valve then opens in the case of an unacceptably high differential pressure between the raw side and the clean side.

A filter device is known from DE 101 05 612 A1, in which a filter element separates a raw side and a clean side in a filter housing, and in which a bypass valve controls a bypass circumventing the filter element. For this, the bypass valve has a valve member for controlling a bypass opening, which connects fluidically with the clean side a coupling chamber of the bypass valve which is fluidically connected with the raw side. The valve member is driven into a closed position, closing the bypass opening, by a pretension produced by a closing spring. The pretension acting on the valve member can be changed by means of an actuating device. In the known filter device, the pretension can be set in a stationary manner to a desired opening pressure by means of the actuating device, depending on the respective purpose of use of the filter device, before the installation of the filter device.

Further filter devices in which the opening pressure, at which a bypass valve opens, can be set in a stationary manner for the respective case of application, are known from DE 20 2007 013 216 U1 and from DE 14 36 289 A.

From FR 15 75 877 A1 a filter device is known which comprises a valve arrangement with a congestion indicator device. The congestion indicator device here has an indicator element which is connected with a membrane mounted between the raw side and the clean side. A congestion of the filter element leads to a pressure rise on the raw side, which leads to a corresponding adjustment movement of the membrane and hence to a corresponding adjustment movement of the indicator element.

In hydraulic systems, in particular in a coolant/lubricant circuit, different system pressures can come into use. For example, a load or working operation and an idle operation can be differentiated from each other. In an idle operation, for example, a minimum volume flow can be necessary, in order to be able to maintain a lubrication of the machines which are connected to the hydraulic circuit. In order to consume as little energy as possible here, a comparatively low pressure level prevails in the hydraulic system during such an idle operation. In order to be able to guarantee the low pressure of the idle operation also in the case of a contaminated filter element, the bypass valve must be able to open already at a relative low pressure. During a working operation or load operation, the hydraulic system must also be able to realize the desired cooling in addition to the lubrication. Accordingly, a greater volume flow is necessary. In addition, in the working operation, the contamination of the coolant/lubricant occurs, so that the full filtration effect of the filter element is to be exhausted. Accordingly, it is desirable to use the system pressure which is available for the filtration of the entire volume flow. Consequently, the bypass valve must only open for the working operation at a relatively high opening pressure. Therefore, contradictory requirements arise for the bypass valve. In addition to this there are particular operating conditions, such as for example a cold start of the hydraulic system, in which the respectively used hydraulic medium, in particular an oil, has a higher viscosity than at its operating temperature.

SUMMARY

The present invention is concerned with the problem of providing for a filter device of the type named in the introduction an improved embodiment, which is distinguished in particular in that it provides different opening pressures for the bypass valve at varying system pressures.

This problem is solved according to the invention by the subject matter of the independent claim. Advantageous embodiments are the subject matter of the dependent claims.

The invention is based in particular on the general idea of equipping the bypass valve with an actuating device, by means of which in the installed state or respectively during the operation of the filter device the pretension can be changed, by which the valve member is driven into its closed position. By means of the actuating device, in particular forces can be produced dependent on at least one control factor, which for example increase or reduce the closing force of a closing spring, in order to thus be able to vary the opening pressure or respectively the opening pressure difference, starting from which the bypass valve opens the bypass. By means of such an actuating device, therefore the opening pressure difference can be varied for different operating conditions. The pretension can be adapted dynamically to varying operating conditions. In particular it is thereby possible, at a low system pressure to also provide a low opening pressure, whilst at the same time a correspondingly increased opening pressure can be provided for a high system pressure. Therefore, for the operating conditions mentioned, namely idle operation and load operation, distinctly different opening pressures can be realized for the bypass valve, in order to make possible the desired functionality for the respective operating condition.

To realize this actuating device, which operates dynamically, i.e. during the operation of the filter device, the actuating device can be coupled with a control chamber and can change the pretension acting on the valve member as a function of a control pressure prevailing in the control chamber.

An embodiment is particularly advantageous here in which the actuating device has an actuating member which separates the control chamber fluidically from the coupling chamber and which is adjustable as a function of a pressure difference between the coupling chamber and the control chamber for changing the pretension acting on the valve member. Therefore, the pressure difference between the coupling chamber and the control chamber can be used as a drive factor or control parameter, in order to adjust the actuating member and hence the pretension.

For example, in accordance with preferred alternatives, the control chamber can communicate with an environment of the filter housing, so that the control pressure depends on the environmental pressure and varies with the environmental pressure. Alternatively, the control chamber can be coupled with a control device for setting the control pressure, whereby quasi arbitrary control parameters can be drawn upon for changing or adapting the control pressure. In particular then also external parameters can be taken into consideration, which correlate for example from an operating condition of a machine equipped with the filter device. Alternatively, the control chamber can also be closed hermetically, whereby the control pressure can be set statically to a predetermined absolute pressure. In this case, no dynamic adaptation of the control pressure is present. Rather, this concerns an alternative solution, by means of which the control pressure in the control chamber can be specified fixedly or respectively absolutely, depending on the case of application.

In accordance with an advantageous embodiment, the closing spring can be supported indirectly via a coupling rod or directly on the actuating member. By changing the position of the actuating member, which can be for example stroke-adjustable, the closing spring can be compressed or decompressed, which leads to a corresponding change to the pretension. Such an actuating member can be configured and arranged particularly simply so that it enables the desired change to the spring pretension.

The actuating member can, for example, be a membrane which separates the coupling chamber from a control chamber. Such a membrane is arranged on the one hand fixedly relative to the filter housing, whilst on the other hand it is movable relative to the filter housing and thereby can adjust a support site of the closing spring indirectly via the coupling rod, or directly. The adjusting of the membrane takes place here as a function of a pressure difference between the coupling chamber and the control chamber. As the coupling chamber communicates with the raw side, the pressure prevailing in the control chamber provides the opening pressure difference. In this respect, the pretension is controlled by the pressure on the raw side.

According to an advantageous further development, the control chamber can be constructed in a pressure cell, on which likewise the membrane is arranged. With such a type of construction, the control chamber can be, in particular, a completely closed chamber, so that an absolute pressure is fixedly provided, against which the pressure in the coupling chamber works, in order to adjust the membrane.

In an alternative embodiment, the actuating member can be configured as a piston which is arranged in a stroke-adjustable manner in a cylinder. Through the adjustability of the piston relative to the filter housing, therefore also the support site of the closing spring can be adjusted, in order to vary its pretension. The piston can also separate a coupling chamber from a control chamber in the cylinder. The said control chamber can—as previously in the case of the pressure cell—be sealed hermetically with respect to the exterior. Likewise, it is possible to connect the control chamber via at least one connection opening with an, in particular atmospheric, environment of the filter housing in a communicating manner. In this case, the pressure prevailing in the coupling chamber works against the environmental pressure. Furthermore, in an alternative embodiment, it is also possible to act on the control chamber with a control pressure via a control pressure connection. Such a control pressure can then be specified in a quasi arbitrary manner. For example, a control device can be provided, which is connected by means of a corresponding control pressure pump, in order to generate control pressures of different extent, which can then be supplied to the control chamber. The control device can be connected for example via at least one pressure sensor with the hydraulic system, in particular with the raw side of the filter housing or with the clean side of the filter housing, in order to be able to set the control pressure as a function of the measured pressures.

Further important features and advantages of the invention will emerge from the subclaims, from the drawings and from the associated description of the figures with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, diagrammatically in each case.

DETAILED DESCRIPTION

Figures 1A, 1B:
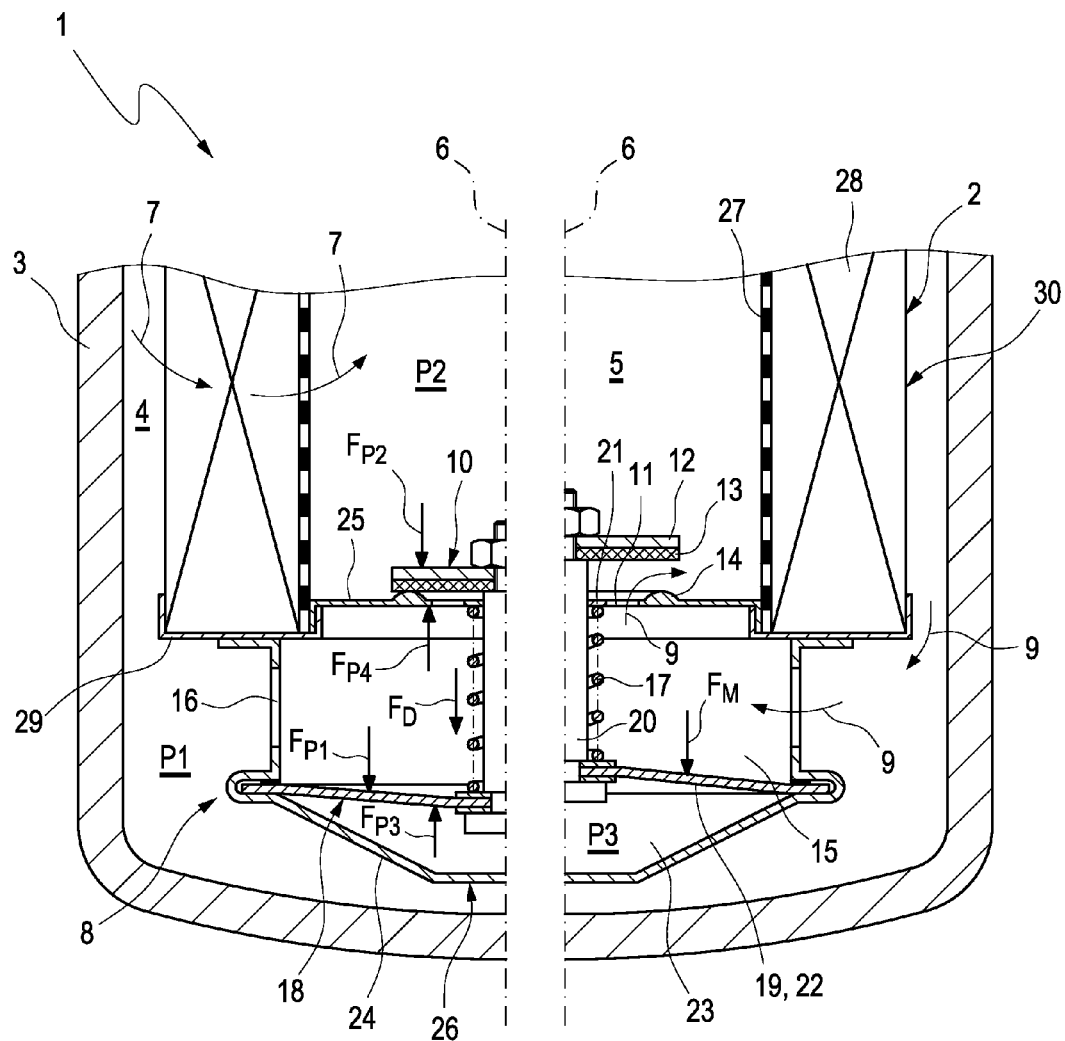
FIG. 1-7 respectively a highly simplified longitudinal section through a filter device in the region of a bypass valve in different embodiments, in which within the respective figure, a closed state (a) is illustrated on the left, and an open state (b) on the right.

In accordance with FIG. 1-7, a filter device 1, which is preferably a fluid filter device and in particular an oil filter device, comprises at least one filter element 2 which is arranged in a filter housing 3 and separates there a raw side 4 from a clean side 5. In the example, the filter element 2 is configured as a ring filter element, which extends cylindrically with respect to a longitudinal central axis 6. In accordance with arrows 7, the filter element 2 is flowed through radially from the exterior towards the interior, so that the raw side 4 is arranged externally and the clean side 5 is arranged internally. Furthermore, the filter device 1 is equipped with a bypass valve 8, which controls a bypass, indicated by arrows 9, which circumvents the filter element 2, i.e. with an opened bypass valve 8 connects the raw side 4 with the clean side 5. The bypass valve 8 has a valve member 10, by means of which a bypass opening 11 is able to be controlled. Here, the valve member 10 closes the bypass opening 11 in the closed position, illustrated on the left, whereas in the open position, illustrated on the right, it more or less frees the bypass opening 11. To realize the desired barrier effect, the valve member 10 can have a comparatively rigid valve plate 12, which on its side facing the bypass opening 11 carries a seal 13 which is configured in the example as a sealing plate. The bypass opening 11 can also have a bead-like opening edge 14, which forms a valve seat with which the seal 13 of the valve member 10 cooperates in the closed position. With an opened valve member 10, the bypass opening 11 connects a coupling chamber 15 of the bypass valve 8 with the clean side 5, i.e. here with the interior of the filter element 2. The coupling chamber 15 communicates in turn via connection openings 16 with the raw side 4.

Figure 2:
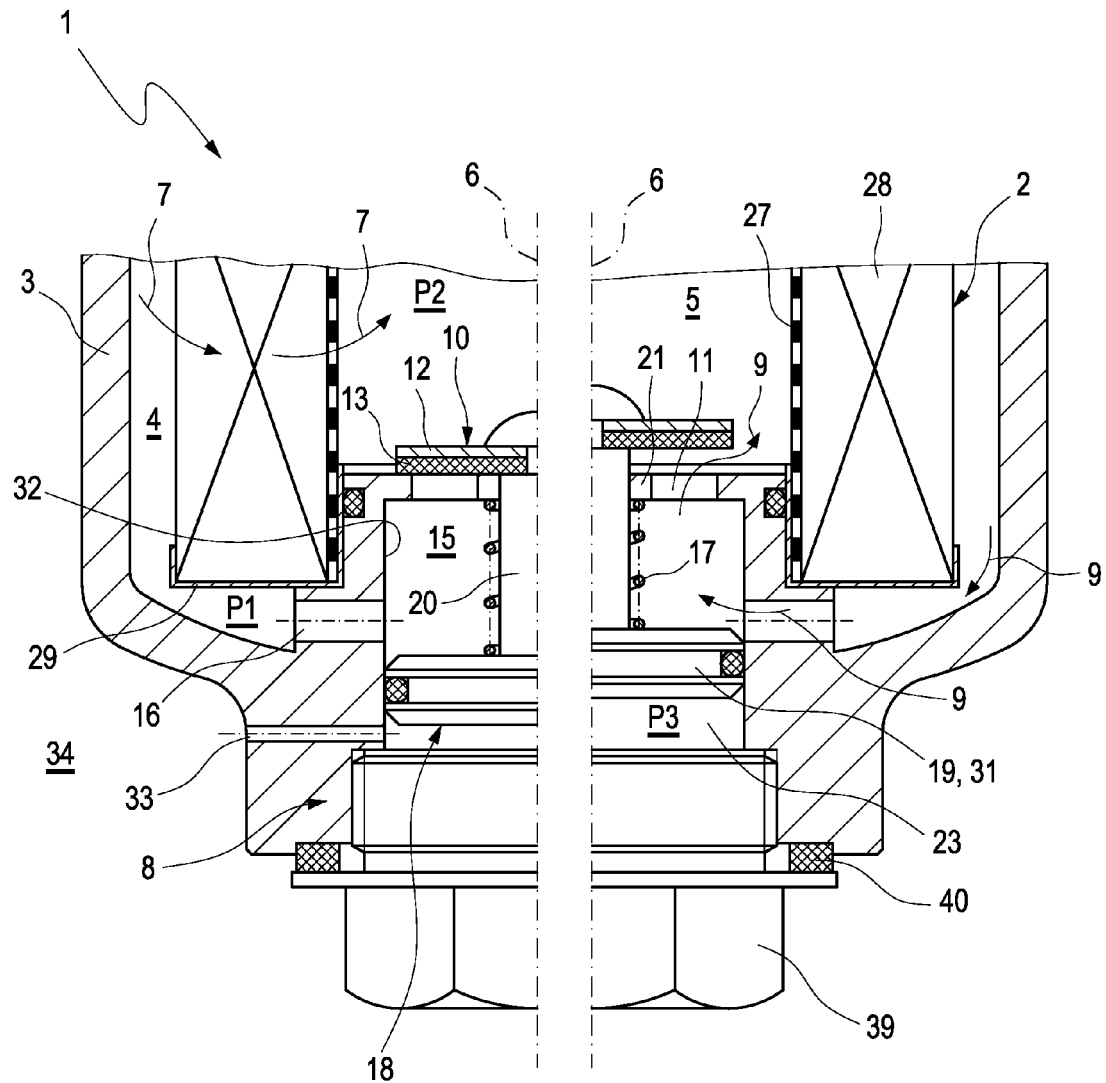
Figure 3:
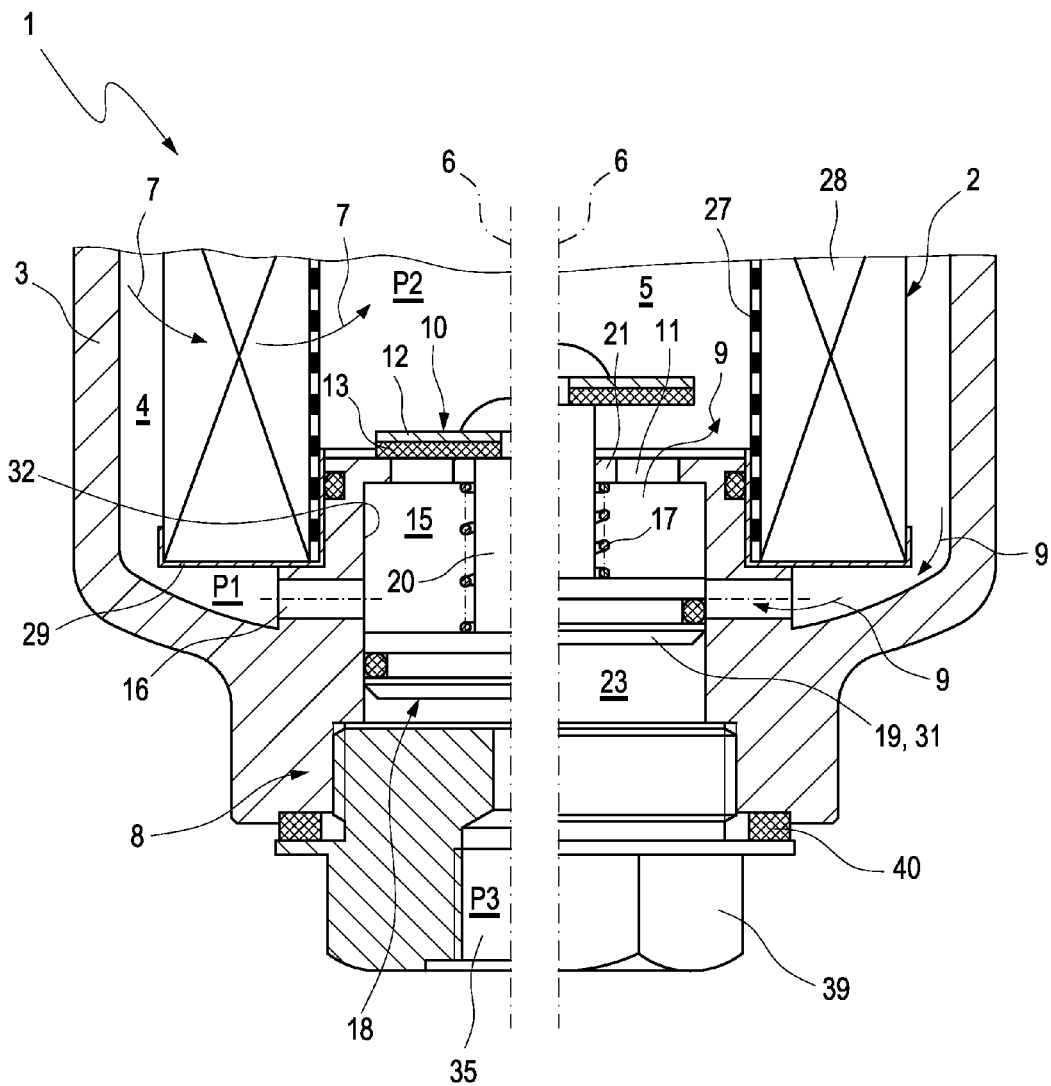

The bypass valve 8 has in addition a closing spring 17. The closing spring 17 serves to prestress or respectively drive the valve member 10 with an elastic- or closing force into the closed position. In FIG. 1 the elastic force is designated by $F_D$. In the embodiments which are shown here, the closing spring 17 is respectively configured as a helical spring. Basically, however, other spring forms are also conceivable, such as for example a plate spring. In the embodiments of FIG. 1-3, the closing spring 17 is configured as a tension spring, so that it introduces a tensile force, acting in the closing direction, onto the valve member 10. In contrast thereto, in the embodiments of FIG. 4-7, the closing spring 17 is configured as a compression spring, which introduces a compressive force, acting in the closing direction, onto the valve member.

The bypass valve 8 is, in addition, equipped with an actuating device 18, by means of which a pretension, driving the valve member 10 into the closed position and which is produced in whole or in part by the elastic force of the closing spring 17, can be altered. For this, the actuating device 18 preferably has an actuating member 19, which is adjustable as a whole or only in an actuating region, in particular is stroke-adjustable. The closing spring 17 is supported on this actuating member 19. The closing spring 17 can be supported directly on the actuating member 19 here, as in the embodiments of FIG. 1-3. Alternatively, the closing spring 17 can also be supported indirectly on this actuating member 19 via a coupling rod 20, as in the embodiments of FIG. 4-7.

FIG. 1-3 show in addition an embodiment in which the closing spring 17 is supported on the one hand on the actuating member 19 and on the other hand on an abutment 21, which is configured fixedly relative to the bypass opening 11. In these embodiments, the coupling rod 20 serves to connect the actuating member 19 securely with the valve member 10. Consequently, an adjustment of the actuating member 19 leads directly to an adjustment of the valve member 10. The forces acting on the actuating member 19 are also transferred here directly to the valve member 10 via the coupling rod 20, whereby accordingly the pretension acting on the valve member 10 changes.

In contrast to this, in the embodiments of FIG. 4-7 the closing spring 17 is supported on the one hand on the valve member 10 and on the other hand on the coupling rod 20. In addition, in these embodiments the coupling rod 20 is connected securely with the actuating member 19, so that an adjustment of the actuating member 19 leads to an adjustment of the coupling rod 20, which changes the position of the support site of the closing spring 17 on the coupling rod side and thereby directly changes the pretension of the closing spring 17. In the embodiments shown here, the valve member 10 is arranged so as to be stroke-adjustable along the coupling rod 20. For this, the coupling rod 20 penetrates the respective valve member 10. In addition, in these embodiments, the closing spring 17 is arranged on a side of the valve member 10 facing away from the actuating member 19. In contrast to this, in the previously explained embodiments of FIG. 1-3 the closing spring 17 is arranged on the same side of the valve member 10 on which the actuating member 19 is also situated.

Figure 4:
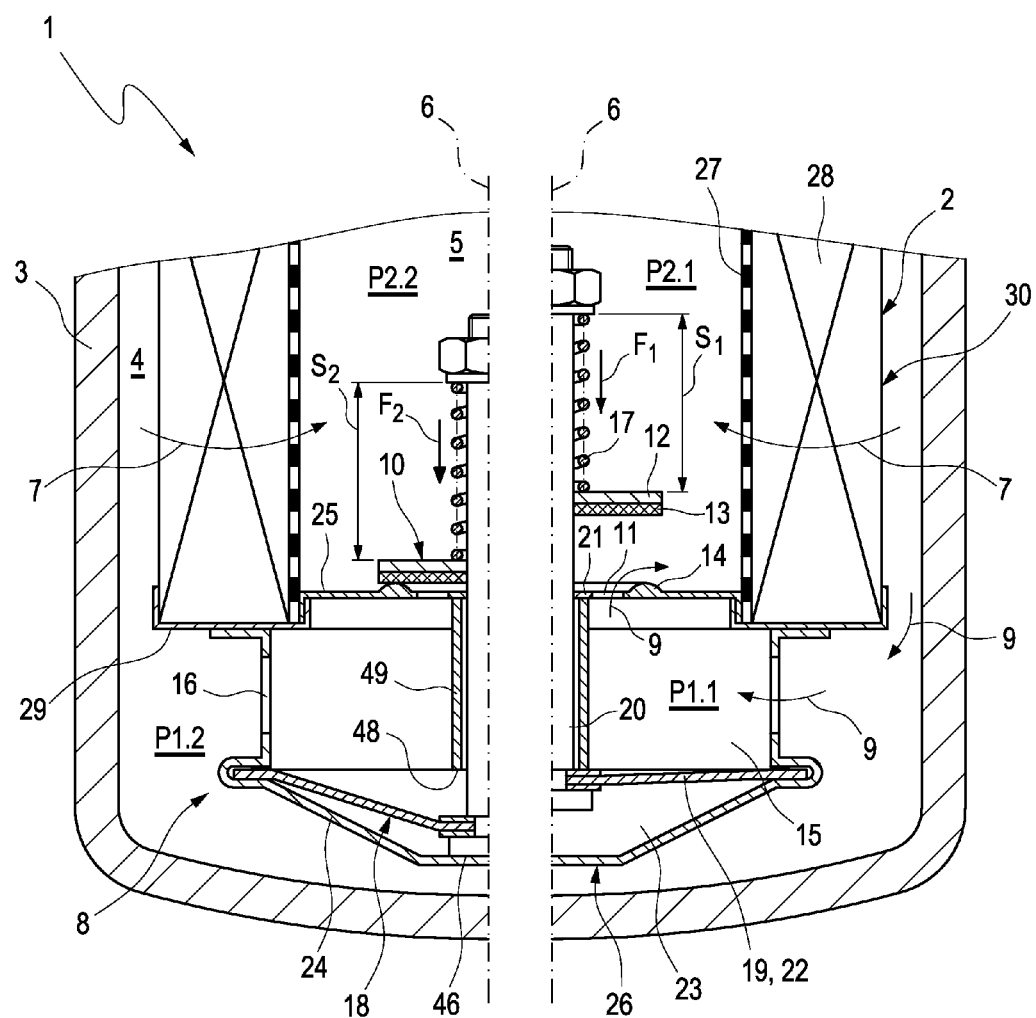

In the embodiments of FIGS. 1 and 4, the actuating member 19 is configured as membrane 22. The membrane 22 is connected on the one hand securely with the coupling rod 20 and on the other hand is fixedly arranged with respect to the filter housing 3. It is flexible in so far as that the central actuating region of membrane 22, which is securely connected with the coupling rod 20, is adjustable with respect to the filter housing 3, in particular is stroke-adjustable. For example, the membrane 22 is produced from a metal sheet. Likewise, the membrane 22 can be produced from plastic. The membrane 22 separates the coupling chamber 15 from a control chamber 23 in a pressure-tight manner, so that the pressure difference between the coupling chamber 15 and the control chamber 23 acts on the membrane 22 and brings about its adjustment.

In the embodiments of FIGS. 1 and 4, the said control chamber 23 is constructed in a pressure cell 24, on which the membrane 22 is also arranged. The pressure cell 14, together with the membrane 22, completely encloses the control chamber 23, so that the latter is sealed hermetically with respect to the exterior. In accordance with the preferred embodiments shown here, the pressure cell 24 has, in addition, a dividing wall 25, which contains the bypass opening 11. In addition, the coupling chamber 15 is formed in the interior of the pressure cell 24. In this respect, the pressure cell 24 contains the complete bypass valve 8. In other words, the bypass valve 8 is integrated into the pressure cell 24. The pressure cell 24 and the bypass valve 8 thereby form a valve assembly 26, which is a separate component with respect to the filter housing 3, and in particular is able to be mounted independently of the filter housing 3. In the embodiments of FIGS. 1 and 4 shown here, this valve assembly 26 is arranged on the filter element 2. The filter element 2 and the valve assembly 26 form separate components here, which are installed adjacent to each other. For example, the filter element 2 can have an inner edge 27, on which a filter material 28 rests radially internally. The filter material 28 is arranged axially on an end disc 20, which is radially open and against which the valve assembly 26 is installed. For example, the valve assembly 26 is inserted axially with a cylindrical section of the pressure cell 24, having the dividing wall 25, into the opening of the end disc 29 or respectively into the inner edge 27. Likewise it is possible to form the valve assembly 26 integrally on the filter element 2. For example, the end disc 29 can be formed integrally on the pressure cell 24.

Irrespective of whether the valve assembly 26 is installed onto the filter element 2 or is formed integrally thereon, the valve assembly 26 and the filter element 2 can form a valve/filter unit 30, which is able to be completely pre-assembled and can be incorporated as a unit into the filter housing 3, and is also exchangeable as a unit. This simplifies the mounting of the valve device 1.

In the embodiments of FIG. 2, 3, 5-7, the actuating member 19 is configured as piston 31. This piston 31 is arranged here so as to be stroke-adjustable in a cylinder 32. In the examples presented here, the cylinder 32 is formed integrally in the filter housing 3. Likewise, a constructed embodiment is also basically conceivable, in which the cylinder 32 is formed in a separate housing, which is incorporated into the filter housing 3.

Figure 5:
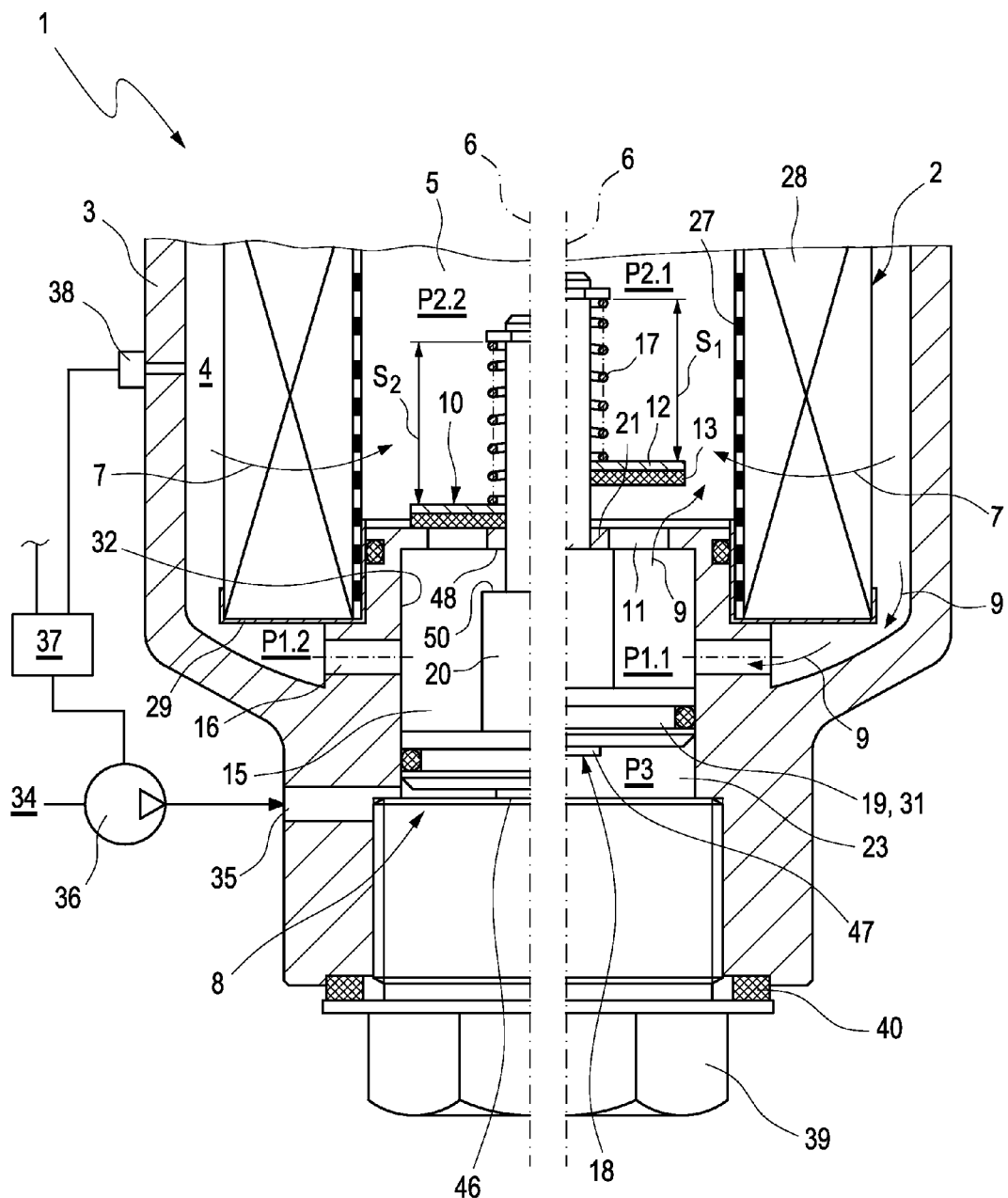
Figures 6A, 6B:
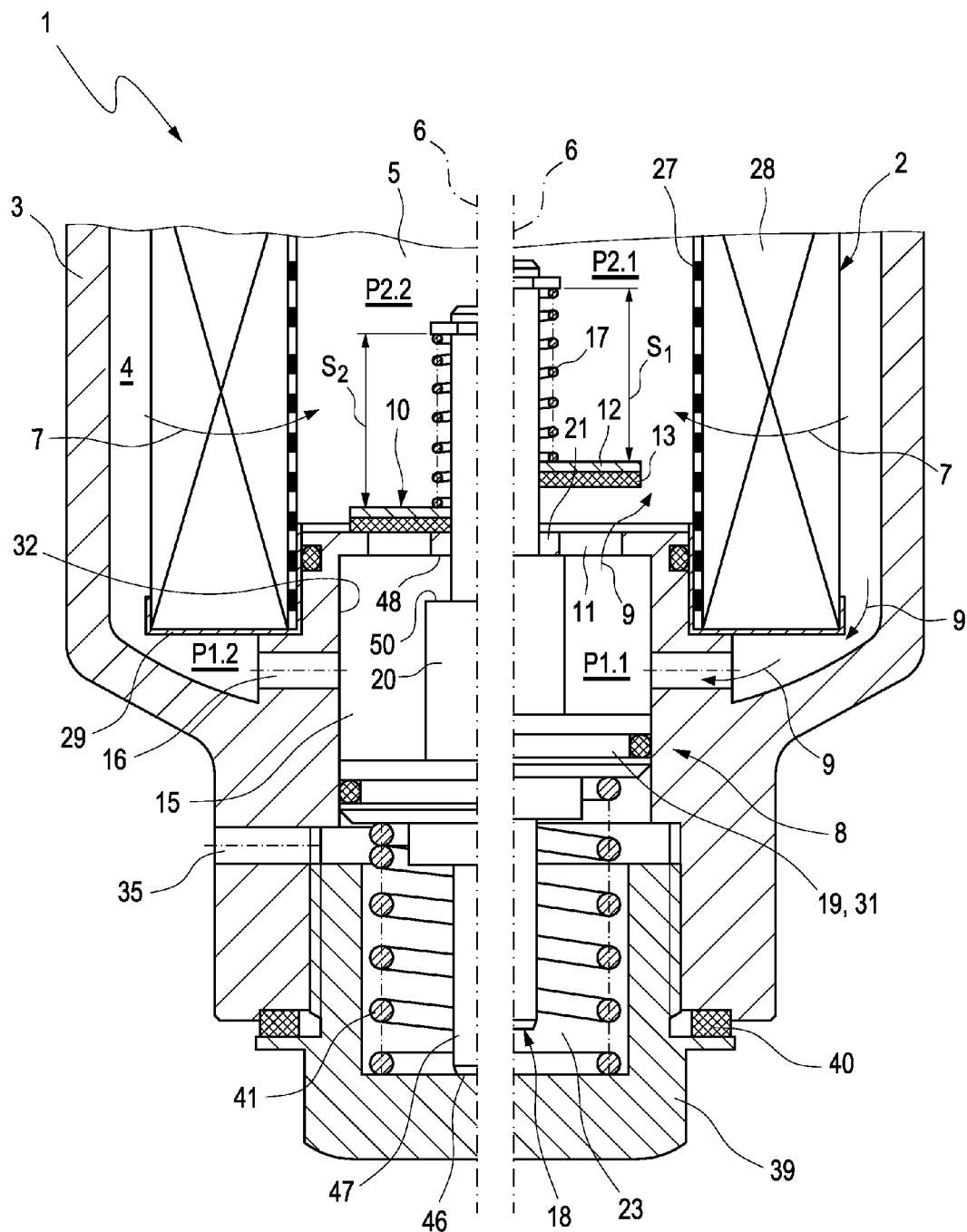

In accordance with the embodiments of FIGS. 2, 5 and 6 in the cylinder 32 the piston 31 can, as above the membrane 22, separate the coupling chamber 15 from a control chamber, which is likewise designated by 23. Depending on the pressure difference between the control chamber 23 and the coupling chamber 15, a stroke or respectively the actuating force for the piston 31 is produced, which has a direct effect on the position of the valve member 10 in the embodiments of FIGS. 2 and 3, and which in the embodiments of FIGS. 5 and 6 affects the pretension of the closing spring 17.

In the embodiment shown in FIG. 2, the control chamber 23 is connected in a communicating manner via at least one connection opening 33 with an environment 23 of the filter housing 3. The said environment 23 is generally atmospheric, so that approximately 1 bar environmental pressure prevails.

In the embodiments of FIGS. 3, 5 and 6 on the other hand, at least one control pressure connection 35 is provided, via which the control chamber 23 can be acted upon with a control pressure. For this, in accordance with FIG. 5, a control pressure pump 36 can be provided, which is connected in a suitable manner to the control pressure connection 35 and which is connected on the suction side for example again to the environment 34. To actuate the pump 36, a control device 37 can be provided, by means of which the control pressure $P_3$ is able to be set. For this, the control device 37 receives input signals on the input side via corresponding control lines, depending on which input signals it actuates the pump 36. For example, the control device 37 can be connected to a pressure sensor 38 which detects the pressure on the raw side. In this way, the control pressure, i.e. the pressure in the control chamber 23, can be set as a function of the pressure on the raw side. The control pressure can be produced here pneumatically or hydraulically.

In the embodiments of FIGS. 2, 3 and 5-7, in which the cylinder 32 is formed integrally in the filter housing 3, the cylinder 32 is closed on a side facing away from or at a distance from the valve member 10 by means of a closure 39, which for this can for example be screwed into the filter housing 3. A seal is designated here by 40, which can be arranged axially between the closure 39 and the filter housing 3.

In FIG. 2 the connection opening 33 is guided through a wall of the filter housing 3. In the embodiments of FIGS. 5 and 6, the control pressure connection 35 is guided through the wall of the filter housing 3. In the embodiment shown in FIG. 3, the control pressure connection 35 is guided through the closure 39, whereby the closure 39 has a dual function, because on the one hand it closes the cylinder 32 and on the other hand it has the pressure connection 35.

The embodiment shown in FIG. 6 differs from the embodiment shown in FIG. 5 in particular by an actuating member spring 41. It serves to pretension the actuating member 19, here the piston 31, in a direction which intensifies the pretension which is produced by means of the closing spring 17. For this, the actuating member spring 41 is arranged in the control pressure chamber 23 and thereby increases the force acting from the control pressure chamber 23 onto the piston 31.

Figure 7:
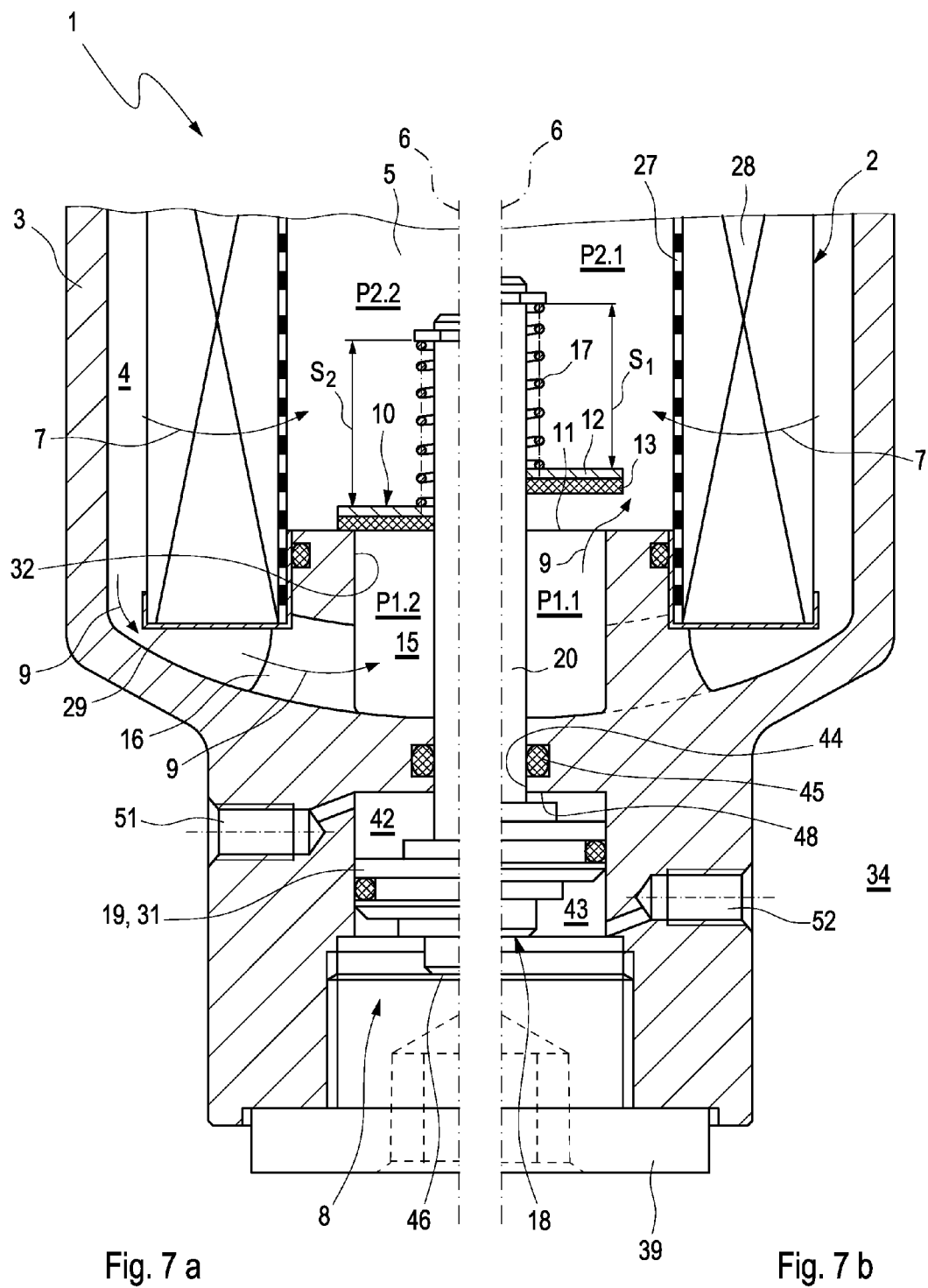

FIG. 7 shows an embodiment in which the piston 31 in the cylinder 32 separates a first control chamber 42 from a second control chamber 43. Here, the two control chambers 42, 43 are fluidically uncoupled from the coupling chamber 15. This means that both control chambers 42, 43 have no communicating connection to the coupling chamber 16. For this, the coupling rod 20 penetrates a guide bore 44 which is introduced in a base of the filter housing 3. In the region of this guide bore 44, in addition a seal 45 can be provided, in order to seal the first control chamber 42 with respect to the coupling chamber 15. The first control chamber 42 is able to be acted upon with a first control pressure via a first control pressure connection 51. The second control chamber 43 is able to be acted upon with a second control pressure via a second control pressure connection 52. Through the difference of the two control pressures, the resulting force acting on the piston 31 can be set, in order to be able to increase or reduce the pretension of the closing spring 17 in a targeted manner. Basically, it is likewise possible to leave one of the two control pressure connections 51, 52 open with respect to the environment 34, so that the respective control pressure connection 51, 52 then serves as a connection opening to the, in particular atmospheric, environment 34.

In the embodiments of FIG. 4-6, the actuating device 18 is equipped in addition with an end stop 46, which is also designated below as first end stop 46. The first end stop 46 serves to delimit the adjustment path of the actuating member 19 in a direction which intensifies the pretension driving the valve member 10 into the closing position. In FIG. 4, this first end stop 46 is formed by a base of the pressure cell 24 lying opposite the membrane 22. The coupling rod 20 comes to lie on the front face against this first end stop 46. In the embodiment shown in FIGS. 5 and 6, the first end stop 46 is respectively formed on the closure 39 against which the respective piston 31 comes to rest via a stop element 47. In addition, the embodiments of FIG. 4-6 show a further or second end stop 48, which delimits the adjustment path of the actuating member 19 in the opposite direction, i.e. in a direction which reduces the pretension which drives the valve member 10 in its closed position. In the embodiment shown in FIG. 4, this second end stop 48 is formed on a sleeve 49 which is arranged coaxially to the coupling rod 20 and which is fixedly arranged with respect to the filter housing 3. In the example, the sleeve 49 is supported by the dividing wall 25, for example on the abutment 21. In the embodiments of FIGS. 5 and 6, the second end stop 48 is formed by the abutment 21 which is fixed to the housing, wherein the coupling rod 20 has an annular step 50, which cooperates with the abutment 21 or respectively with the second end stop 48.

The filter devices 1 which are presented here operate as follows:

In accordance with FIG. 1, the filter element 2 is equipped with a fixedly arranged bypass valve 8. The bypass valve 8 is surrounded by a valve cage which surrounds the coupling chamber 15 and which has the connection openings 16. A base of the valve cage, facing away from the filter element 2, is formed by the pressure cell 24. The membrane 22 is securely connected with the coupling rod 20, which can also be designated as the shaft of the valve 8. The coupling rod 20 draws the valve member 10, configured as a plate, by the force $F_D$ of the closing spring 17 onto the respective valve seat, which is formed here by the opening edge 14 of the bypass opening 11. The valve member 10 keeps the valve 8 or respectively the bypass opening 11 closed. The pressure cell 24 is acted upon in its control chamber 23 with a control pressure $P_3$, which can be 1 bar for example. In normal operation, the filter housing 3 is acted upon on the raw side with an internal pressure $P_1$, which can be 10 bar for example. This internal pressure $P_1$ also acts on the outer side of the membrane 22, facing the coupling chamber 15, in the pressure cell 24. This now produces a force $F_M$, which forms from the difference of the forces $F_{P1}-F_{P3}$. These are the forces resulting from the pressure difference $P_1-P_3$. This resulting force $F_M$ onto the membrane 22 acts in addition to the closing force $F_D$ of the closing spring 17 onto the valve member 10. If the system pressure now changes, i.e. the pressure on the raw side $P_1$, for example in the idle state of the arrangement, for example to 2.5 bar, then the membrane force $F_M$ onto the coupling rod 20 reduces and hence also the opening pressure of the bypass valve 8. The increase or respectively reduction of the closing force of the valve 8 is calculated from the ratio of the membrane surface to the surface of the valve member 10. The bypass valve 8 opens when the pressure from $P_2$ on the clean side 5 of the filter element 2 drops and hence the force $F_{P4}$ on the valve member 10 exceeds the sum of the forces $F_{P2}$, $F_D$ and $F_M$.

In the embodiment shown in FIG. 2, the bypass valve 8 is integrated into the filter housing 3 and is accordingly not changed with the filter element 2. The function of the membrane 22 in the pressure cell 24 is undertaken here by the piston 31 in the cylinder 32.

In the embodiment shown in FIG. 3, the control pressure $P_3$ can be adapted to the operating conditions in a variable manner. The increase of the control pressure $P_3$ brings about a lowering of the valve opening pressure. This means that the valve member 10 then already opens in the case of a smaller differential pressure between the raw side and the clean side. The control pressure $P_3$ can be applied hydraulically or pneumatically.

In the embodiment shown in FIG. 4, the spring travel of the closing spring 17 is delimited or respectively defined respectively by a mechanical stop 46 or respectively 48. In the state of rest or respectively in idle mode, the membrane 22 is drawn by the closing spring 17 against the upper or second stop 48. A spring travel $S_1$ is long and thereby the elastic force $F_1$ is low, so that also the valve opening pressure is low in this case. This situation is illustrated in FIG. 4b. The system pressure on the raw side is then $P_{1.1}$. The pressure on the clean side if then $P_{2.1}$.

When the system pressure now increases on the raw side to an increased value $P_{1.2}$, the membrane 22 is pressed into the pressure cell 24. Starting from a defined pressure, the end position at the lower or first stop 46 is then reached. On the clean side, the pressure $P_{2.2}$ then prevails. A spring travel $S_2$ is now short and accordingly the elastic force $F_2$ is high. Therefore, the valve opening pressure is also set high.

Through the delimited spring travel between the paths $S_1$ and $S_2$, the valve opening pressure can be set to a value associated with the lower system pressure. When the system pressure increases, the closing spring 17 is pretensioned up to the specified position of the membrane 22 at the lower or first stop 46. Thereby, the higher valve opening pressure is effective. A further increase of the system pressure no longer changes the valve opening pressure.

The embodiment shown in FIG. 5 largely corresponds to the embodiment shown in FIG. 4, wherein here, however, the pressure control does not take place via the membrane 22, but rather via the piston 31. At the same time, provision is made in this embodiment to specify the control pressure $P_3$ via the control pressure connection 35.

In the embodiment shown in FIG. 6, the piston 31 is driven with the additionally provided actuating member spring 41 into the upper end position associated with the second end stop 48, and is held therein until the piston force, applied by the system pressure, exceeds the elastic forces of the actuating member spring 41 and those of the closing spring 17, and drives the piston 31 in the direction of the first end stop 46, i.e. here into the lower position. The changeover pressure of the valve 8 is determined here by the piston surface and by the elastic force of the actuating member spring 41. The transition phase from low to increased valve opening pressure hereby becomes smaller.

In the embodiment shown in FIG. 7, the pretension of the closing spring 17 is changed through the pressure difference between the two control chambers 42, 43. By varying the pressure difference, the position of the piston 31 or respectively its force and hence the pretension acting on the valve member 10 can be set.

In the example, this takes place by tensioning or respectively relieving of tension of the closing spring 17, i.e. by changing the elastic force. Alternatively, it is basically also possible in this type of construction to dispense with the closing spring 17 and to produce the pretension, acting and able to be set at the valve member 10, exclusively via the actuating device 18.

In a simple embodiment for both control chambers 42, 43 a predetermined control pressure is provided, which is supplied to the respective control chamber 42, 43 alternately, whilst the respective other control chamber 42, 43 is relieved towards the environment 34. Thereby, the valve opening pressure can also be varied here between two settings.

The invention claimed is:

1. A filter device, comprising:
   a filter housing having at least one filter element configured to separate the filter housing into a raw side and a clean side,
   a bypass valve for controlling a bypass circumventing the at least one filter element,
   wherein the bypass valve has a valve member for controlling a bypass opening, which connects the clean side and a coupling chamber of the bypass valve the raw side,
   wherein the valve member is configured to close the bypass opening via a pretension generated, at least partially, by a closing spring,
   wherein the bypass valve has an actuating device for changing the pretension acting on the valve member, and wherein
   the actuating device is coupled with at least one control chamber and is configured to set the pretension acting on the valve member based at least in part on a control pressure of the control chamber.

2. The filter device according to claim 1,
   wherein the actuating device has an actuating member which separates the control chamber from the coupling chamber and which is adjustable as a function of a pressure difference between the coupling chamber and the control chamber for changing the pretension acting on the valve member.

3. The filter device according to claim 2,
   wherein the closing spring is supported indirectly via the actuating member on one side and by an abutment fixed relative to the bypass opening on the other side.

4. The filter device according to claim 3,
   wherein the closing spring and the actuating member are arranged on opposite sides with respect to the valve member.

5. The filter device according to claim 3, wherein the actuating member and the closing spring are arranged on the same side with respect to the valve member.

6. The filter device according to claim 2,
   the actuating member is a membrane which separates the coupling chamber from the control chamber.

7. The filter device according to claim 6,
   wherein the control chamber is formed in a pressure cell, on which the membrane is arranged, wherein the control chamber is hermetically closed in the pressure cell,
   wherein the pressure cell has a dividing wall containing the bypass opening, and
   wherein the pressure cell and the bypass valve form a separate valve assembly with respect to the filter housing.

8. The filter device according to claim 7,
wherein the valve assembly is arranged on the filter element, and
the valve assembly and the filter element form a unit incorporated exchangeably into the filter housing.

9. The filter device according to claim 2,
wherein the actuating member is a piston configured to be stroke-adjustable in a cylinder and separate the cylinder into the coupling chamber and the control chamber.

10. The filter device according to claim 9,
wherein the cylinder is formed integrally in the filter housing, and
the control chamber is connected in a communicating manner via a connection opening with an environment of the filter housing.

11. The filter device according to claim 2,
further comprising an actuating member spring configured to pretension the actuating member in a direction reinforcing the pretension.

12. The filter device according to claim 2,
further comprising a first end stop configured to limit the adjustment path of the actuating member in a direction reinforcing the pretension, and
a second end stop configured to limit the adjustment path of the actuating member in a direction reducing the pretension.

13. The filter device according to claim 2, wherein the closing spring is supported indirectly via a coupling rod, wherein the coupling rod connects the actuating member securely with the valve member so that an adjustment of the actuating member leads to an adjustment of the valve member.

14. The filter device according to claim 13, wherein the closing spring is supported by the valve member on one side and by the coupling rod on the other side, wherein the coupling rod is securely connected with the actuating member so that an adjustment of the actuating member leads to a change of the pretension of the closing spring.

15. The filter device according to claim 14, wherein the valve member is stroke-adjustable along the coupling rod.

16. The filter device according to claim 2, wherein the closing spring is supported directly on the actuating member.

17. The filter device according to claim 1,
wherein the control chamber is at least one of hermetically closed, communicates with an environment of the filter housing, and is coupled with a control device for setting the control pressure.

18. The filter device according to claim 1,
further comprising a cylinder including the coupling chamber, wherein the actuating device has an actuating member adjustable for changing the pretension acting on the valve member, and configured as a piston, further wherein the piston separates the cylinder into a first control chamber and a second control chamber.

19. The filter device according to claim 18,
wherein the first control chamber is able to be acted on with a control pressure via a control pressure connection and the second control chamber is connected in a communicating manner via a connection opening with an environment of the filter housing.

20. The filter device according to claim 18, wherein the second control chamber is able to be acted on via a further control pressure connection with a different control pressure.

* * * * *

UNITED STATES PATENT AND TRADEMARK OFFICE
CERTIFICATE OF CORRECTION

PATENT NO.       : 8,956,531 B2
APPLICATION NO.  : 13/391899
DATED            : February 17, 2015
INVENTOR(S)      : Gröner et al.

Page 1 of 1

It is certified that error appears in the above-identified patent and that said Letters Patent is hereby corrected as shown below:

In the Claims:

At column 10, claim number 1, line number 27, please add "with" after "valve".

It should read as follows, "bypass valve with the raw side,"

Signed and Sealed this
Twenty-third Day of June, 2015

Michelle K. Lee
*Director of the United States Patent and Trademark Office*